Oct. 9, 1962  V. IGNATJEV  3,057,948
SELF-PRIMING CELL
Filed Sept. 21, 1960

INVENTOR.
VLADIMIR IGNATJEV
BY
ATTORNEY

United States Patent Office 3,057,948
Patented Oct. 9, 1962

3,057,948
SELF-PRIMING CELL
Vladimir Ignatjev, 39 Ledgewood Drive,
East Norwalk, Conn.
Filed Sept. 21, 1960, Ser. No. 57,519
7 Claims. (Cl. 136—90)

This invention relates to electric cells and more particulary to an improved structure having one or more self-priming cells. The advantages obtained by using a battery in which there is no electro-chemical action until such action is desired, are well known.

Known cells of the self-priming type separate the electrolyte from the battery plates usually by enclosing it in a container. The occurrence of some chosen event directly or indirectly causes the container to be opened, permitting the electrolyte to contact the two plates and start to initiate the production of electricity.

Since the self-priming cell must be immune to accidental shocks, the rupturable container must not be excessively fragile. This has created a problem, since the force available to break the container is sometimes small. This problem is accentuated when, as is often the case, more than one cell must be activated by a single event.

Accordingly, it is an object of this invention to provide an improved self-priming cell.

It is a further object of this invention to provide a self-priming cell which can be activated by the application of a relatively small external force.

It is a still further object of this invention to provide a self-priming cell having its electrolyte isolated from its plates by a rupturable container which contains an internal structure to insure breaking the container when desired.

It is another object of the invention to provide a multicell, self-primary battery, all cells of which may be readily primed by the application of a single external force.

Other and further objects and advantages of the invention will be clear from the ensuing description, when read in conjunction with the accompanying drawings.

Figure 1:
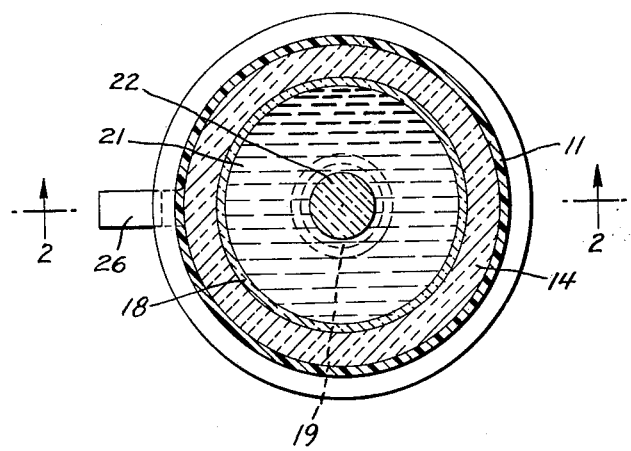
FIG. 1 is a sectional view of an embodiment of the invention taken on line 1–1 of FIG. 2.
Figure 2:
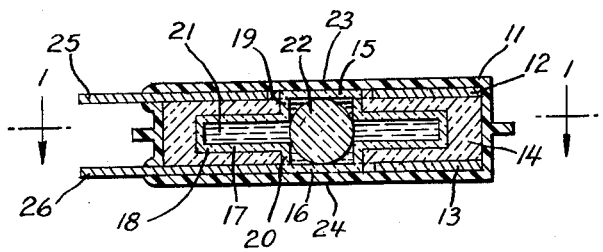
FIG. 2 is a section of the embodiment shown in FIG. 1 taken on line 2–2 of FIG. 1.

Referring now to FIGS. 1 and 2 wherein like numerals refer to the same parts.

A housing 11 is provided which preferably is made of some easily deformable material such as a soft plastic. Within housing 11 are electrodes 12 and 13, separated from one another by an absorbent medium 14 effective to disperse the electrolyte when it is released. A material such as fiber glass has been found to be satisfactory though any absorbent not destroyed by the electrolyte would suffice. Each of electrodes 12 and 13 has an aperture therethrough, at their approximate centers through which ends 15 and 16 of reservoir 17 passes. The ends of 15 and 16 butt against housing 11. Reservoir 17 may be constructed of any fragile material and thin glass has been found satisfactory. Reservoir 17 in the embodiment shown, consists of a cylinder 18 having two cylindrical extensions, 19 and 20.

An electrolyte 21 such as $H_2SO_4$, depending on the type of plates, is sealed within reservoir 17, isolated from electrode 12 and 13. Also enclosed within reservoir 17 is a rigid member 22. Member 22 should be formed of a material that will be unaffected by the electrolyte. Further, member 22 should be in contact with ends 15 and 16 of reservoir 17. Finally, the dimensions of member 22 should be such that it is relatively free from movement within reservoir 17. In the embodiment shown, a solid glass ball was found to be satisfactory.

With the structure shown and described above, a blow on either central portion 23 or 24 of housing 11 will shatter reservoir 17 since the fragile structure of reservoir 17 is more easily broken and more completely shattered because of the presence of structure 22 therewithin.

Leads 25 and 26, attached respectively to electrodes 12 and 13, pass through housing 11 and permit the cell to be used when reservoir 17 is broken, freeing electrolyte 21.

Figure 3:
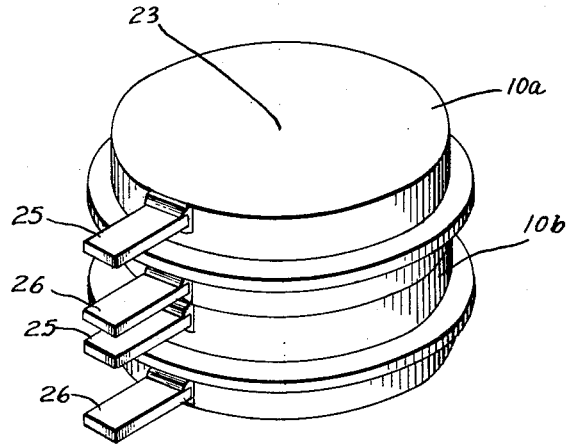
FIG. 3 is a perspective view of a multicelled embodiment of the invention.

The advantages of this novel construction is still more clearly shown in FIG. 3 wherein like numerals refer to the same parts. FIG. 3 shows a pair of cells 10, arranged in stack fashion, though more than two cells may be used. For simplicity of explanation the structure shown in FIG. 3 is simply two cells constructed in accordance with FIG. 1, placed one on top of the other, it should be understood, however, that in commercial use, where multicell batteries would frequently be desirable, modifications could be made. For example, one of the adjacent walls of housings 11, shown as 11a and 11b, could be dispensed with.

It can easily be seen in FIG. 3, that any force applied to portion 23 of the housing of cell 10a will be rapidly transmitted, through structure 22a to the housing of cell 10b thereby rupturing the reservoir of that cell as well.

It can be seen, therefore, that by virtue of the simple and inexpensive structure set forth above, an extended number of cells may be provided and the application of a single external force to the appropriate portion of the topmost cell causes that force to the transmitted throughout the area of cells in accordance with well known laws of elementary physics.

While what is presently considered to be the best modes of the invention, as set forth above, modifications and substitutions will be clear to those skilled in the art. Accordingly, it is intended to limit this invention only by the scope of the following claims:

What is claimed:

1. A self-priming cell comprising a housing, first and second electrodes within said housing, a non-conductive absorbent material separating said electrodes, a closed reservoir in said housing containing an electrolyte therewithin, and rigid means located within said reservoir having one dimension substantially equal to a dimension of said reservoir, said reservoir being more fragile than said rigid means, said rigid means cooperating in the rupture of said reservoir when said cell is to be activated permitting said electrolyte to be introduced to the electrodes.

2. A self-priming cell comprising a housing, having a wall portion and top and bottom portions, an electrode fixed to each of said top and bottom portions, a non-conductive, electrolyte dispersing agent within said housing and between said electrodes, each of said electrodes having an aperture formed therethrough, a frangible reservoir containing an electrolyte, opposite ends of said reservoir abutting said top and bottom housing portions through said electrode apertures, a rigid member within said reservoir, said rigid member abutting said ends of said reservoir which abut said top and bottom housing portions through said electrode apertures said rigid member cooperating in the rupture of said reservoir when said cell is to be activated permitting said electrolyte to be introduced to said electrodes.

3. A self-priming cell comprising a housing, having a wall portion and top and bottom portions, a frangible reservoir containing an electrolyte within said housing, opposite sides of said reservoir respectively abutting a part of said housing, a rigid member within said reservoir formed of a material impervious to said electrolyte, a portion of said rigid member abutting said opposite sides of said reservoir, and a pair of spaced electrodes within said housing and fixed thereto said rigid member cooperating in the rupture of said reservoir when said cell is to be activated permitting said electrolyte to be introduced to the electrodes.

4. A self-priming cell comprising a housing, a pair of electrodes within said housing spaced apart from each other, a frangible container within said housing containing an electrolyte, and a rigid member within said container said rigid member cooperating in the rupture of said container when said cell is to be activated permitting said electrolyte to be introduced to the electrodes, said rigid member being less frangible than said container.

5. A self-priming cell comprising a housing, a pair of fixed electrodes within said housing spaced apart from each other, a frangible container fixed within said housing containing an electrolyte, the exterior surface of said container abutting said housing in at least two places, and a member within said container, said member being less frangible than said container, said member abutting the interior surface, said container at the places where said external container surfaces abut said housing said rigid member cooperating in the rupture of said container when said cell is to be activated permitting said electrolyte to be introduced to the electrodes.

6. A self-priming battery comprising a plurality of connected cells, each of said cells including a housing, a pair of spaced electrodes within said housing, a frangible container containing an electrolyte within said housing, and a rigid member within said container, said plurality of cells having their electrodes connected in series fashion, each of said containers abutting its associated housing at at least two points, said points of said housings lying on a substantially straight line said rigid members cooperating in the rupture of said containers when said cell is to be activated permitting said electrolyte to be introduced to the electrodes.

7. A self-priming battery comprising a plurality of series-connected cells, each of said cells including a housing having a wall portion and top and bottom portions, a positive and a negative electrode each having an aperture formed therethrough, a negative electrode fixed in each of said housings and spaced from each other, means connecting the positive electrode of one cell to the negative electrode of the next cell, a frangible container containing an electrolyte in each of said cells, said container abutting said top and bottom portions of said housing through said electrode apertures, said electrode apertures in said plurality of cells having a substantially common axis, and a rigid member within each of said containers, said rigid member being less frangible than said containers, each of said rigid members abutting its enclosing container where said contianer abuts its associated housing said rigid members cooperating in the rupture of said containers when said cell is to be activated permitting said electrolyte to be introduced to the electrodes.

References Cited in the file of this patent

UNITED STATES PATENTS

| | | |
|---|---|---|
| 2,847,494 | Jeannin | Aug. 12, 1958 |
| 2,862,038 | Blaru | Nov. 25, 1958 |
| 2,931,848 | Burrell | Apr. 5, 1960 |